May 30, 1939.  J. WERTZHEISER  2,160,771
TOASTER
Filed Feb. 9, 1937

Joseph Wertzheiser INVENTOR
BY
Gifford, Scull & Burgess ATTORNEYS

Patented May 30, 1939

2,160,771

UNITED STATES PATENT OFFICE 2,160,771

TOASTER

Joseph Wertzheiser, Brooklyn, N. Y., assignor of eighty-five per cent to Lionel A. Bauman, Brooklyn, N. Y.

Application February 9, 1937, Serial No. 124,807

6 Claims. (Cl. 53—5)

This invention relates to a device for toasting materials in such a manner that predetermined areas of the surface of the material to be toasted are shielded from the toasting heat so that emblems, letters, or the like remain visible due to untoasted surface areas. The invention will be described particularly in connection with a device that is adapted for toasting bread, but it is to be understood that the invention is not restricted to this particular use.

Heretofore it has been found that when shields have been used to protect untoasted surfaces on materials that are toasted, the shields often do not lie flat against the surfaces during the toasting period, with the result that the margins of the untoasted areas are not sharply defined but, on the contrary, are rough or gradually merged into the toasted surfaces. By the present invention the surface of the shield is made of the same shape as the surfaces to be shielded, which is usually flat, and the shield is caused to lie against the entire surface which it shields and all parts of the shield are pressed against the surface which it protects with substantially the same pressure.

Figure 2:
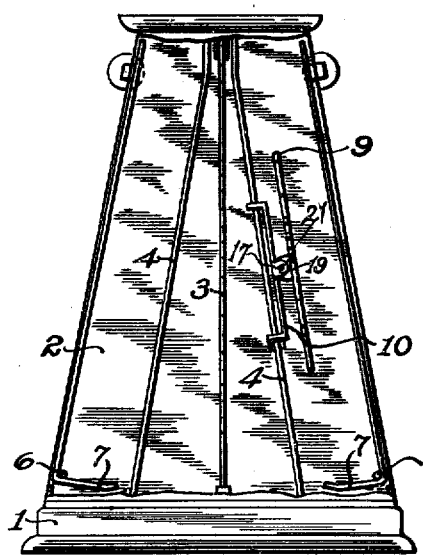
Figure 1:
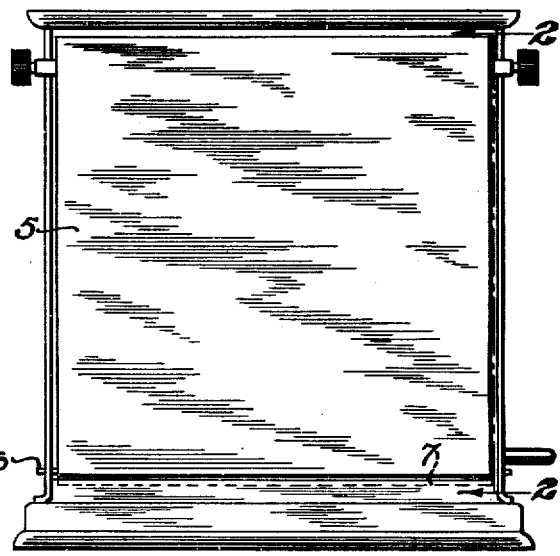
Figure 3:
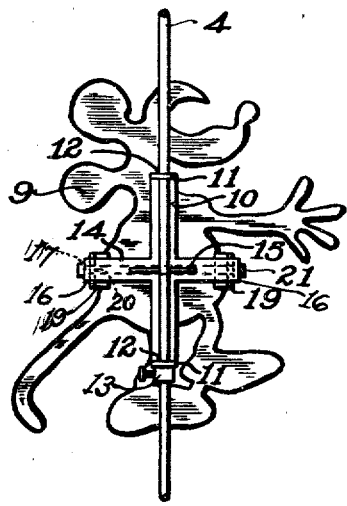

The invention will be understood from the description in connection with the accompanying drawing, in which Fig. 1 is a side view of an illustrated embodiment of the invention, Fig. 2 is a section along the line 2—2 of Fig. 1, and Fig. 3 is a side view of the shield and its support on an enlarged scale.

In the drawing, reference character 1 indicates the bottom of an electric toaster of a well-known sort that has a heating or toasting compartment 2 with its side walls sloping inwardly in an upward direcion. The heating compartment 2 is provided with heating coils 3 which are somewhat diagrammatically illustrated, and rows of wire or rods 4 are shown between the heating coils 3 and the sloping sides of the compartment to protect the bread or the like that is to be toasted from coming into direct contact with the heating coils.

Doors 5 are provided in the sloping walls of the heating compartment. These doors are pivoted or hinged at 6 and are provided with inwardly extending ledges 7 for supporting the slices of bread to be toasted.

A flat shield 9 is supported on one of the rods 4 so that one side thereof will lie flat against the bread that is being toasted. This shield 9 is mounted on one of the rods 4 so that it can be adjusted up and down, and it is also mounted in such manner that its entire surface is automatically caused to lie flat against the bread by the bread coming into contact with it.

A metal bracket 10 is provided with ends 11 bent at right angles, and these ends are provided with holes or slots 12 through which one of the rods 4 passes. An adjustable ring or stop 13 is placed on the rod 4 to hold the bracket 10 in any desired position on this rod.

A cross bar 14 is provided for the bracket 10 and may be strengthened by a strengthening rib 15, if desired. The ends 16 of the cross bar 14 are bent at right angles, and these bent ends are provided with holes 17.

The flat shield 9, that is for the purpose of protecting bread or the like from heat that is radiated from the heating coils 3, may be of any desired shape or it may be made up of letters or words or designs. The particular design that is illustrated in Fig. 3 of the drawing is in the form of a Mickey Mouse. Lugs 19 are attached to the shield 9 and are spaced apart approximately the same distance as the bent ends 16 of the cross bar 14. These lugs 19 are provided with holes 20, and a pin or bolt 21 extends through the holes 17 of the bent ends 16 of the cross bar 14 and also through the holes 20 of the lugs 19.

With the shield 9 pivoted by the lugs 19 on the shaft or pin 21, and with the bracket 10 pivoted by the lugs 11 on a rod 4 which extends at right angles to the pin 21, the shield 9 is mounted on a universal joint so that its entire flat surface will lie against the bread or other material that is pressed against it. This will be true even if the bread is wedge-shaped or has become accidentally shifted askew in its holder, so that the entire surface of the bread or the like that is intended to be shielded from the heat is shielded uniformly over the entire shielded area thereof.

I claim:

1. In a toaster, a heat shield, and means operated by material to be toasted to cause said shield to lie flat against a surface of said material, said means comprising lugs pivoted on shafts at right angles to each other, and some of said lugs being slidable along one of said shafts.

2. In a toaster, a heating element; a heat shield; and means supporting said shield and operated by material to be toasted, said means being mounted to rotate about different axes, independently of said heating element, to cause said shield to lie flat against a surface of said material.

3. In a toaster, a heating element; a support to hold material to be toasted in spaced relation to said heating element; a heat shield positioned between the heating element and said support, and means mounted to rotate independently of said element to cause said shield to lie flat against a surface of said material.

4. In a toaster, a fixed heating element; a support to hold material to be toasted in spaced relation to said heating element; a heat shield positioned between the heating element and said support, and means mounted to rotate about different axes independently of said element to cause said shield to lie flat against a surface of said material.

5. In a toaster, a fixed heating element; a support to hold material to be toasted in spaced relation to said heating element; a heat shield positioned between the heating element and said support and support means for said shield, said support means being mounted to rotate about different axes independently of said element to cause said shield to lie flat against a surface of said material.

6. In a toaster, a heating element; a support to hold material to be toasted in spaced relation to said heating element; a heat shield positioned between the heating element and said support; and support means for said shield, said means including brackets mounted to rotate about axes transverse with respect to each other, to cause said shield to lie flat against a surface of said material.

JOSEPH WERTZHEISER.

CERTIFICATE OF CORRECTION.

Patent No. 2,160,771.   May 30, 1939.

JOSEPH WERTZHEISER.

It is hereby certified that the name of the assignee of eighty-five per cent interest in the above numbered patent was erroneously described and specified as "Lionel A. Bauman" whereas said name should have been described and specified as Lionel R. Bauman, of Brooklyn, New York, as shown by the record of assignments in this office; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.

between the heating element and said support, and means mounted to rotate independently of said element to cause said shield to lie flat against a surface of said material.

4. In a toaster, a fixed heating element; a support to hold material to be toasted in spaced relation to said heating element; a heat shield positioned between the heating element and said support, and means mounted to rotate about different axes independently of said element to cause said shield to lie flat against a surface of said material.

5. In a toaster, a fixed heating element; a support to hold material to be toasted in spaced relation to said heating element; a heat shield positioned between the heating element and said support and support means for said shield, said support means being mounted to rotate about different axes independently of said element to cause said shield to lie flat against a surface of said material.

6. In a toaster, a heating element; a support to hold material to be toasted in spaced relation to said heating element; a heat shield positioned between the heating element and said support; and support means for said shield, said means including brackets mounted to rotate about axes transverse with respect to each other, to cause said shield to lie flat against a surface of said material.

JOSEPH WERTZHEISER.

CERTIFICATE OF CORRECTION.

Patent No. 2,160,771. May 30, 1939.

JOSEPH WERTZHEISER.

It is hereby certified that the name of the assignee of eighty-five per cent interest in the above numbered patent was erroneously described and specified as "Lionel A. Bauman" whereas said name should have been described and specified as Lionel R. Bauman, of Brooklyn, New York, as shown by the record of assignments in this office; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.